United States Patent [19]

Stewart, Jr. et al.

[11] Patent Number: 4,950,563
[45] Date of Patent: Aug. 21, 1990

[54] PHOSPHORIC ACID FUEL CELLS WITH IMPROVED CORROSION RESISTANCE

[75] Inventors: Robert C. Stewart, Jr., West Suffield; Vincent J. Petraglia, Vernon, both of Conn.

[73] Assignee: International Fuel Cells, South Windsor, Conn.

[21] Appl. No.: 289,869

[22] Filed: Dec. 27, 1988

[51] Int. Cl.5 ............................................. H01M 8/02
[52] U.S. Cl. ....................................... 429/34; 427/115
[58] Field of Search ................... 429/34; 427/105, 115

[56] References Cited

U.S. PATENT DOCUMENTS

| 3,341,348 | 9/1967 | Letendre | 428/332 X |
| 3,591,468 | 7/1971 | Nishio et al. | 204/35 R |
| 3,671,317 | 6/1972 | Rifkin | 427/115 |
| 3,942,230 | 3/1976 | Nalband | 29/132 |
| 4,295,951 | 10/1981 | Bommaraju et al. | 204/242 |
| 4,357,262 | 11/1982 | Solomon | 252/425.3 |
| 4,666,787 | 5/1987 | Bickle et al. | 428/550 |

FOREIGN PATENT DOCUMENTS

| 57-114683 | 7/1982 | Japan. | |
| 60-95863 | 5/1985 | Japan | 429/34 |
| 62-141165 | 6/1987 | Japan. | |

Primary Examiner—Stephen J. Kalafut
Attorney, Agent, or Firm—Charles E. Sohl

[57] ABSTRACT

Corrosion in manifolds and ducts in phosphoric acid fuel cells can be reduced by electroplating a chromium-fluorocarbon polymer composite coating onto the exposed metal surfaces. The chromium-fluorocarbon coating displays superior corrosion protection and improved adhesion after being subjected to a plurality of heating and cooling cycles. The improved corrosion protection enhances fuel cell operating reliability and allows the use of less expensive materials in the construction of the manifolds and ducts.

4 Claims, 1 Drawing Sheet

PHOSPHORIC ACID FUEL CELLS WITH IMPROVED CORROSION RESISTANCE

TECHNICAL FIELD

This invention relates generally to phosphoric acid fuel cells and more specifically to corrosion inhibition in phosphoric acid fuel cells.

BACKGROUND ART

A fuel cell is a device which converts chemical energy directly into electrical energy. A typical fuel cell comprises two electrodes, a cathode and an anode, separated by a matrix impregnated with an electrolyte, an external electrical connection between the anode and the cathode, and manifolds and ducts for supplying reactants to the fuel cell and for removing reaction products from the fuel cell. One common electrolyte is phosphoric acid. Fuel cells which use phosphoric acid as the electrolyte are referred to as phosphoric acid fuel cells.

A fuel cell generates electricity when a hydrogen-rich gas is supplied to the anode as a fuel and oxygen, typically in the form of air, is supplied, to the cathode as an oxidant. The anode oxidizes hydrogen to hydrogen ions and electrons. The hydrogen ions flow through the electrolyte to the cathode, while the electrons flow through the external electrical connection to the cathode. At the cathode, oxygen is reduced and reacted with the hydrogen ions and electrons to produce water and heat. Phosphoric acid fuel cells typically operate at a temperature between 150° C. and 200° C. and a pressure between 1 atmosphere and 8 atmospheres.

At typical phosphoric acid fuel cell operating conditions, phosphoric acid is extremely corrosive. Although the phosphoric acid in the fuel cell is normally contained within a matrix fabricated from a corrosion-resistant material, it is not uncommon for some phosphoric acid to escape entrainment in the matrix and come into contact with the manifolds and ducts. Unless the manifolds and ducts, which are typically fabricated from a metal such as steel, are protected in some way from the phosphoric acid, they will corrode. Corrosion of fuel cell manifolds and ducts can lead to a loss of integrity such that phosphoric acid and fuel cell reactants are released to the surrounding environment, forcing the fuel cell to be shut down.

Several means are available to inhibit corrosion of fuel cell manifolds and ducts. One method is to fabricate the manifolds and ducts from materials which inherently resist corrosion. Such materials include stainless steel and other metal alloys. Other corrosion-resistant materials include plastics, such as high temperature reinforced polysulfones. However, these corrosion-resistant materials are generally expensive, making them impractical for many fuel cell applications. Moreover, many of these corrosion-resistant materials, especially plastics, are difficult to fabricate into fuel cell manifolds and ducts.

An alternate approach to protecting metal phosphoric acid-fuel cell manifolds and ducts from corrosion is to coat the manifolds and ducts with a corrosion-resistant compound. The preferred coatings are fluorinated hydrocarbon polymers. The most preferred corrosion-resistant coating for phosphoric acid fuel cell manifolds and ducts is perfluoroalkoxy (PFA) polymer. While PFA and similar polymers provide satisfactory corrosion protection, it is difficult to apply the coatings directly to the surfaces of the manifolds and ducts because PFA and similar compounds are chemically inert. Generally, these compounds can be applied to metal surfaces only if a bonding agent such as an organosilane primer is used to aid adhesion.

Even after the polymer has been successfully applied to a metal surface, it is difficult to keep the coating intact. When placed in service, hydrogen molecules and water vapor penetrate the polymer coating and break the bonds between the metal surface and the polymer. This causes the polymer to slough off of the metal surface, exposing the metal surface to corrosive attack by phosphoric acid. Moreover, the polymer which sloughs off of the metal surface interferes with the flow of reactants and products through the manifolds and ducts, forcing the fuel cell to shut down.

One way to minimize the effects of gas or water vapor penetration is to apply the polymer in a thick coat. However, a thick coat of polymer accentuates the differences between the coefficients of thermal expansion of the polymer coating and the underlying metal surface. For example, PFA has a coefficient of thermal expansion which is about three times that of steel. When reactants are supplied to a cold fuel cell and the fuel cell is heated to operating temperature, the polymer coating expands to a much greater extent than the metal surface, causing the polymer to debond from the metal surface of slough off. A similar phenomenon occurs when the supply of reactants is terminated and the fuel cell is cooled. As a result, the metal surface is exposed to corrosive attack by phosphoric acid, while the debonded polymer coating interferes with the fuel cell operation.

The problem associated with chemically bonding PFA and similar compounds to fuel cell manifolds and ducts can be overcome by mechanically bonding the coatings to the metal surface. A mechanical bond between the polymer coating and the metal surface is formed when the polymer is applied to a porous metal surface, or tie coat, which has been bonded to the top of the manifolds and ducts. The tie coat contains numerous pores and cracks. The mechanical bond between the polymer coating and the metal tie coat is formed when molten polymer flows into the pores and cracks of the tie coat and solidifies.

Several techniques are available for mechanically bonding a polymer coating to fuel cell manifolds and ducts. The most common method is to spray molten metal onto the surface of the manifolds and ducts with a thermal or plasma spray gun in order to form the porous tie coat. The polymer may be applied to the porous tie coat either as a solid or in a semi-fluid state. Upon heating, the polymer flows and fills the pores and cracks of the tie coat. When cooled, the polymer solidifies and becomes locked inside of the pores and cracks of the tie coat, forming the mechanical bond. While this method can be successfully used to apply a corrosion-resistant polymer coating to fuel cell manifolds and ducts, alternate methods of producing a comparable coating are desirable in order to permit manufacturing operations to be optimized.

Accordingly, there has been a continuous effort in this field of art to develop an alternate means for producing a corrosion-resistant polymer coating on top of fuel cell manifolds and ducts.

DISCLOSURE OF INVENTION

The present invention is directed towards solving the problem of effectively applying a corrosion-resistant polymer coating to fuel cell manifolds and ducts. The term ducts as used herein refers to ducts and manifolds unless indicated to the contrary.

One aspect of the invention includes a phosphoric acid fuel cell comprising an anode for hydrogen oxidation, a cathode for oxygen reduction, an external electrical connection between the anode and the cathode, a matrix impregnated with phosphoric acid, and steel manifolds and ducts. The manifolds and ducts supply a hydrogen-rich gas to the anode and oxygen to the cathode. The manifolds and ducts also remove water and excess reactants from the fuel cell. The improvement comprises a chromium-fluorocarbon composite coating which is electroplated onto the manifolds and ducts. The composite coating may utilize a copper and nickel undercoat, a layer of pore-containing chromium, and a fluorocarbon polymer which fills the pores of the chromium layer.

Another aspect of the invention is a method of generating electricity in a phosphoric acid fuel cell as recited above, including supplying a hydrogen-rich gas and oxygen to the fuel cell. The hydrogen is oxidized at the anode to hydrogen ions and electrons. The hydrogen ions flow to the cathode through the phosphoric acid, while the electrons flow to the cathode through the external electrical connection. The flowing electrons generate a useable electric current. At the cathode the oxygen is reduced and reacted with the hydrogen ions and electrons to form water and heat. The fuel cell is subjected to a cycle of heating when the supply of reactants is initiated and cooling when the supply of reactants is terminated. The improvement comprises a chromium-fluorocarbon composite coating which is electroplated onto the manifolds and ducts. The composite coating may comprise of a copper and nickel undercoat, a layer of pore-containing chromium, and a fluorocarbon polymer which fills the pores of the chromium layer.

The foregoing and other features and advantages of the present invention will become more apparent from the following description and accompanying drawings.

BEST MODE FOR CARRYING OUT THE INVENTION

The chromium-fluorocarbon composite coating may be applied to the surface of fuel cell manifolds and ducts using the Chrome-Slick TM process supplied by Chromium Industries (Chicago, IL). Chrome-Slick coatings were developed to provide release surfaces on paper calendaring rolls used in the paper industry. However, in the fuel cell environment it is the corrosion-resistant properties of the Chrome-Slick coating rather than release properties which are sought.

The Chrome-Slick coating is a composite of a porous chromium layer impregnated with a fluorocarbon polymer. In a phosphoric acid fuel cell, the preferred fluorocarbon polymer is perfluoroalkoxy polymer (PFA). The PFA is most concentrated at the surface of the coating which will be exposed to phosphoric acid in order to impart good corrosion protection. There is essentially no PFA at the interface between the coating and the fuel cell manifolds and ducts. The absence of PFA at this interface permits a strong metal-to-metal bond between the coating and the manifolds and ducts.

Figure 1:
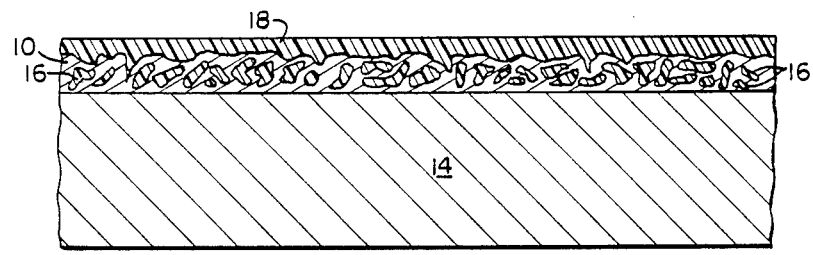
FIG. 1 shows a chrome-fluorocarbon composite coating which has been applied to the surface of a fuel cell manifold or duct.
Figure 2:
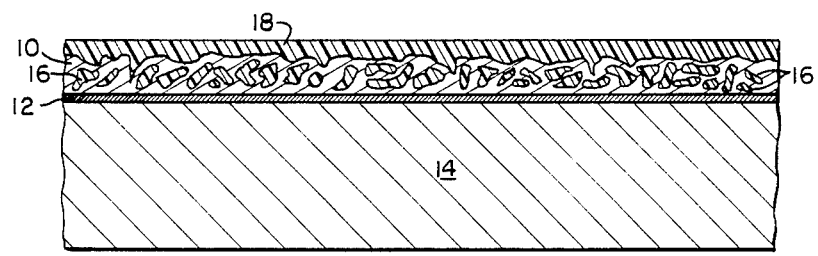
FIG. 2 shows a chrome-fluorocarbon composite coating which has been applied to the surface of a fuel cell manifold or duct with a layer of copper-nickel intermediate the substrate and chrome-fluorocarbon layer.

The chromium-fluorocarbon coating is applied using a technique such as that described in U.S. Pat. No. 3,341,348 to Letendre or alternatively the technique as described in U.S. Pat. No. 3,591,468 to Nishio et al, the disclosures of which are hereby incorporated by reference. As shown in FIG. 2, the chromium layer (10) may be electroplated on top of an undercoat (12) or directly on the surface of a manifold or duct (14). FIG. 1 shows the invention without the undercoat (12), FIG. 2 shows the invention with the undercoat (12). The undercoat (12) may comprise a material selected from the group consisting of copper and nickel and mixtures thereof deposited in a thickness of between approximately 2 mils to approximately 5 mils. The preferred thickness for the chromium layer (10) in a fuel cell environment is between approximately 2 mils to approximately 4 mils. Pores (16) are created in the chromium layer (10) either by blasting the chromium plate (10) with an abrasive as described in the Letendre patent or by reversing the polarity of the electrodes used to deposit the chromium layer (10) as described in the Nishio patent (U.S. Pat. No. 3,591,468). Finally, a layer of PFA (18) is deposited on the chromium layer (10) and is heated to fuse the PFA into a continuous film. The PFA may be deposited on the chromium layer as a dispersion, as a fine powder, or by any of the other common means of applying a fluorocarbon polymer to a metal surface. A preferred method of depositing the PFA onto the chromium is with an electrostatic spray. Another preferred method is to use a thermal spray gun as described in commonly assigned copending application Ser. No. 237,924, filed on Aug. 29, 1988, the disclosure of which is hereby incorporated by reference. Preferably, the PFA coating will extend to between approximately 0.5 mil to approximately 50 mils above the top of the chromium layer.

EXAMPLE

The example describes the invention form shown in FIG. 1. A typical fuel cell carbon steel manifold for supplying reactants to the fuel cell is treated to remove oxide film and oils used in the process of rolling and forming the steel. The cleaning process consists of abrading the surface to be plated with aluminum oxide, washing with water, electrolytically degreasing, rewashing with water, removing rust with hydrochloric acid and electrolytically etching the steel in a chrome plating bath.

The surface of the plate thus prepared is then plated with chromium to form a glossy surface. The polarities of the plating electrodes are then reversed periodically to etch the surface and develop pits and cracks in it. The chrome coating should have between 15 and 55% porosity and be between 5 and 50 mils thick. The pits and cracks should not extend all the way through to the substrate metal.

An aqueous dispersion containing 60% polyethylene tetrafluoride then sprayed on the surface and dried by application of heat. This coating process is repeated until the desired thickness of from 0.5 to 50 mils is achieved. The coating is then sintered at a temperature of about 380° to fuse and lock the fluorocarbon into the interstices of the chromium layer.

The Chrome-Slick coating provides fuel cell manifolds and ducts with the corrosion resistance they need to resist attack by phosphoric acid. The PFA portion of the coating provides the corrosion resistance. The chromium portion of the Chrome-Slick coating provides a strong metal-to-metal bond between the coating and the metal manifolds and ducts. The metal-to-metal bond allows the coating to remain bonded to the manifolds and ducts even after being subjected to a plurality of heating and cooling cycles. A corrosion-resistant coating such as the Chrome-Slick coating allows the use of materials such as carbon steel for the fabrication of fuel cell manifolds and ducts, rather than stainless steel or other corrosion-resistant metals. Using the Chrome-Slick coating technique as an alternative to existing corrosion protection methods will permit the manufacture of fuel cell manifolds and ducts to be optimized.

Although this invention has been shown and described with respect to detailed embodiments thereof, it will be understood by those skilled in the art that various changes in form and detail thereof may be made without departing from the spirit and scope of the claimed invention.

We claim:
1. A phosphoric acid fuel cell having:
    (a) an anode for hydrogen oxidation,
    (b) a cathode for oxygen reduction, the anode and cathode being electrically connected external to the fuel cell;
    (c) a matrix impregnated with a phosphoric acid electrolyte in contact with said anode and cathode; and
    (d) corrosion prone ducts for supplying a hydrogen-rich gas to said anode, for supplying oxygen to said cathode, and for removing water producted at the cathode,
    wherein said ducts include a corrosion-resistant chromium fluorocarbon composite coating comprising a layer of pore-containing chromium plated on the duct surfaces, and perfluoroalkoxy polymer filling the pores of the chromium layer resulting in a corrosion-resistant coating which protects said ducts from the corrosive effects of said phosphoric acid, and demonstrates improved adhesion to the surfaces of said ducts.

2. A fuel cell as in claim 1 wherein said coating includes an undercoat, of a material selected from the group consisting of copper and nickel and mixtures thereof, between the duct surface and the pore-containing chromium layer.

3. A method of generating electricity in a phosphoric acid fuel cell including:
    supplying a hydrogen-rich gas and oxygen to a phosphoric acid fuel cell having an anode for hydrogen oxidation, a cathode for hydrogen reduction, the anodes and cathodes being electrically connected external to the fuel cell, a matrix impregnated with a phosphoric acid electrolyte in contact with said anode and cathode, and using ducts coated with a corrosion-resistant chromium-fluorocarbon composite coating comprising a layer of pore-containing chromium plated on the surface of the duct, and perfluoroalkoxy polymer filling the pores of the chromium layer resulting in a corrosion-resistant coating for supplying the hydrogen-rich gas to said anode, for supplying oxygen to said cathode, and for removing water produced at the cathode, wherein the hydrogen is oxidized at the anode to produce hydrogen ions which flow to said cathode through the electrolyte and electrons which flow to said cathode through the external electrical connection generating a useable electrical current and the oxygen is reduced and reacted at said cathode with the hydrogen ions and electrons formed at said anode to produce water and heat, subjecting the fuel cell to cycles of heating when the supply of reactants is terminated, such heating and cooling resulting in thermally induced expansion and contraction of the ducts, said coating protecting said ducts from the corrosive effects of said phosphoric acid.

4. The method of claim 3 wherein said coating includes an undercoat, of a material selected from the group consisting of copper and nickel and mixtures thereof, between the duct surface and the pore-containing chromium layer.

* * * * *